C. C. PECK.
Amalgamator.
No. 51,079.
Patented Nov. 21, 1865.
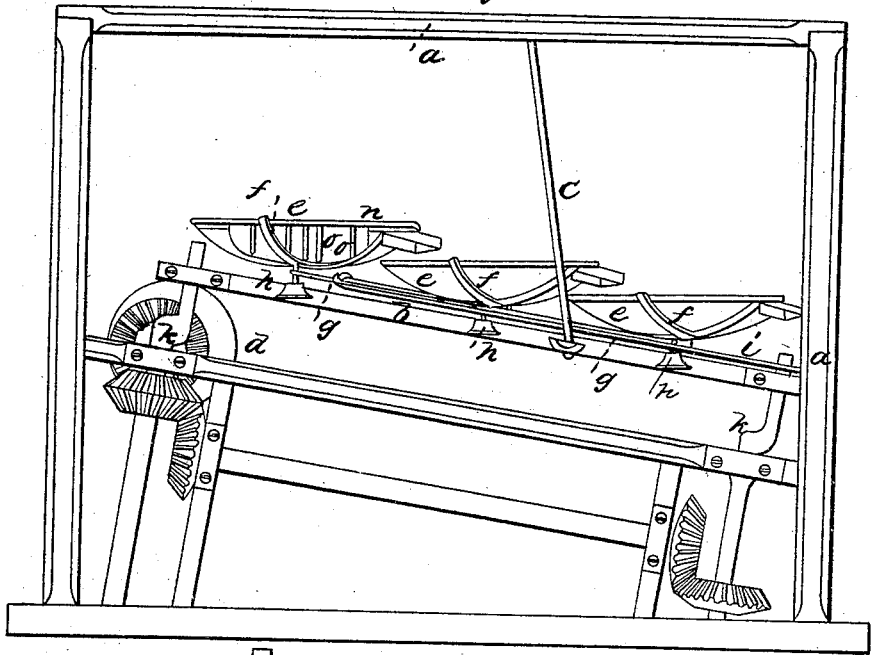
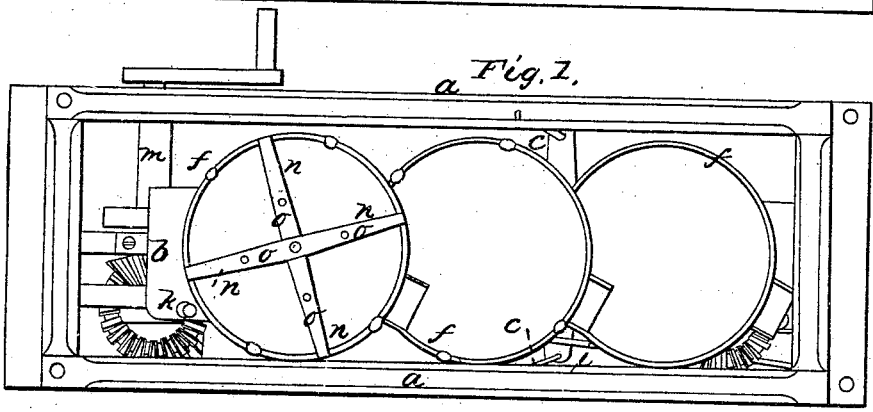
Witnesses:
F. Gould
W. B. Gleason
Inventor:
C. C. Peck
by his Atty
J. B. Crosby

UNITED STATES PATENT OFFICE.

C. C. PECK, OF BLACKHAWK, COLORADO.

IMPROVED AMALGAMATOR.

Specification forming part of Letters Patent No. 51,079, dated November 21, 1865.

*To all whom it may concern:*

Be it known that I, C. C. PECK, of Blackhawk, in the county of Gilpin and Territory of Colorado, have invented an Improved Amalgamator; and I do hereby declare that the following, taken in connection with the drawings which accompany and form part of this specification, is a description of my invention sufficient to enable those skilled in the art to practice it.

Letters Patent of the United States numbered 46,492, were granted to me on the 21st day of February, A. D. 1865, for an improved amalgamator. In said amalgamator a series of pans are arranged upon a frame or platform in such manner that the spout of each (excepting the lower one) shall project over the pan next below it, this platform being so hung in the main frame and arranged with reference to actuating mechanism that in operating the machine an up-and-down movement, a forward and back movement, and a vibrating movement are simultaneously communicated to the pans for the purpose of agitating the crushed gold containing quartz in the pans, to bring all particles of it intimately into contact with the quicksilver, as the current of water flows through the series of pans. It is to such or a similar organization that my present invention relates.

This invention consists in so organizing the mechanism that in addition to these motions imparted to the pans they shall also have a direct and simultaneous lateral movement imparted to them, which has the effect to more thoroughly agitate and bring into contact the quartz and quicksilver.

The improvement further consists in the manner of mounting one or more of the pans so as to be readily removable, and in the combination, with one or more of them, of stirrers which operate in the movement of the pans, to divide and break into separate currents the agitated masses of quartz and the stream of water running through the series of pans.

The drawings represent a series of pans embodying my present improvement, Figure 1 showing a plan, and Fig. 2 a side elevation, of the same.

$a$ denotes the frame-work, in which the platform $b$ is suspended by means of rods $c$, one end of the platform resting on the periphery of an eccentric or cam wheel, $d$. This platform supports the series of pans $e$ by means of spiders, $f$, upon which each pan rests, and a journal-pin projecting therefrom into a bearing-plate upon the platform. The pans are connected together on one side by a rod, $g$, and a pin, $h$, fastened to the spider of each pan, and this rod $g$ is connected to the stationary frame $a$ by a rod, $i$, so that if the platform is moved to and fro endwise each pan will rock horizontally on its journal. Such a reciprocating endwise movement is imparted to the platform by means of cranks $k$ $k$, the shafts of which are rotated by any suitable system of gearing, and the driving-shaft $m$, which bears the eccentric or cam wheel $d$. Thus it will be obvious that by rotation of the shaft the platform of pans receives a reciprocating vertical motion by means of the wheel $d$ (the weight of the upper end of the platform keeping it in contact with this wheel) and a reciprocating longitudinal or endwise movement through the cranks $k$, while the endwise movement of the platform causes each pan to rock horizontally by means of the rods $g$ $i$, these movements being imparted simultaneously, and being substantially the same as are given in the construction shown in my patent before referred to. In that construction, however, the longitudinal movement was imparted by a rod or link jointed at one end to the platform and at the other end to the cam or eccentric, while by my present improvement I impart this movement by means of the cranks $k$, which in their rotation carry the platform laterally as well as longitudinally, giving a reciprocating lateral movement to each pan. The result of this combined lateral and longitudinal movement is to give each pan a circular or nearly circular motion, which, taken in connection with the vibrating and vertical movement, proves very effective in producing the agitation of the contents of the pans, the contact of the mercury with all the crushed quartz, and the consequent separation of all or a large maximum of the particles of gold. Other means may be employed for imparting the lateral movement; but I consider the mechanism shown to be the simplest and most effectual.

One or more of the pans I support on its spider or arms in such manner as to permit of easy removal. This is done by extending each of the arms of the spider upon which the pan rests up to and over the top edge of the pan, which is then allowed to rest loosely in position, held down by the spider, and is removed by slightly turning up the ends of the spider-arms or by slipping the pan from under them, as will be readily understood. I also extend across the top of one or more of the pans cross-bars $n$, from the under surface of each of which a pin, $o$, projects down into the body of the pan, as seen in Fig. 2, where one of the pans is represented as broken at the side to show these pins. In the agitating movements of the pan these pins act as stirrers, to divide the contents of the pan and promote the intermixture of mercury and quartz.

I claim—

1. The arrangement of an amalgamating-pan or a series of pans and a mechanism for agitating the same, so that, in connection with a combined longitudinal and vertical or longitudinal and vibrating movement, said pan or pans shall have a reciprocating lateral movement, substantially as set forth.

2. Extending the spider-arms over the edge of the pan, thereby holding the pan in position and permitting its easy removal, substantially as set forth.

3. The pins or projections $o$, extending down into one or more of the pans, substantially in the manner and for the purpose specified.

In witness whereof I have hereunto set my hand this 12th day of June, A. D. 1865.

C. C. PECK.

Witnesses:
F. GOULD,
W. B. GLEASON.